United States Patent
Dujon

(10) Patent No.: US 10,954,170 B2
(45) Date of Patent: Mar. 23, 2021

(54) **METHOD OF COMMERCIAL PRODUCTION OF AQUEOUS *SARGASSUM* SEAWEED EXTRACT CONCENTRATE AND BIOSTIMULANT PRODUCTS**

(71) Applicant: Dujco LLC, Castries (LC)

(72) Inventor: Johanan Jeffrey Dujon, Castries (LC)

(73) Assignee: Dujco LLC, Castries (LC)

( * ) Notice: Subject to any disclaimer, the term of this patent is extended or adjusted under 35 U.S.C. 154(b) by 0 days.

(21) Appl. No.: 16/968,740

(22) PCT Filed: Oct. 16, 2019

(86) PCT No.: PCT/US2019/056517
§ 371 (c)(1),
(2) Date: Aug. 10, 2020

(87) PCT Pub. No.: WO2020/081671
PCT Pub. Date: Apr. 23, 2020

(65) Prior Publication Data
US 2021/0002183 A1    Jan. 7, 2021

Related U.S. Application Data

(60) Provisional application No. 62/746,147, filed on Oct. 16, 2018.

(51) Int. Cl.
*C05F 5/00*     (2006.01)
*C05F 17/60*    (2020.01)
(Continued)

(52) U.S. Cl.
CPC .............. *C05F 5/002* (2013.01); *A01C 21/00* (2013.01); *A01N 65/00* (2013.01); *A01N 65/03* (2013.01);
(Continued)

(58) Field of Classification Search
CPC .......... C05F 5/002; C05F 17/10; C05F 17/60; C05F 17/40; C05F 17/20; A23J 1/009;
(Continued)

(56) References Cited

U.S. PATENT DOCUMENTS

2015/0259706 A1 * 9/2015 Tsuchida .................. C12N 1/22
435/161

FOREIGN PATENT DOCUMENTS

| WO | 2016181411 A1 | 11/2016 |
|---|---|---|
| WO | 2017044744 A1 | 3/2017 |
| WO | 2017044774 A1 | 3/2017 |

OTHER PUBLICATIONS

Sharma et al., "Plant Biostimulants: a review on the processing of macroalgae and use of extracts for crop management to reduce abiotic and biotic stresses", Journal of Applied Phycol (2014) 26:465-490, Published online Aug. 14, 2013, especially abstract, p. 466, col. 2, para 3; p. 469 col. 2, para 3; p. 470, col. 1 para 1-3 p. 470, col. 1, para 2; p. 470, col. 2, para 2; p. 471, col. 1, para 2.

(Continued)

*Primary Examiner* — Fred Prince
(74) *Attorney, Agent, or Firm* — Nancy J. Flint, Attorney At Law, P.A.; Nancy J. Flint, Esq.

(57) ABSTRACT

A system and method for commercial production of aqueous *Sargassum* seaweed extract concentrate having arsenic level of around 1.32-15 mg/l; cadmium level of around 0.005-5 mg/l; lead level of around 0.2-12 mg/l; mercury level of around 0.00002-2 mg/l; and pH of around 7.4-9 is disclosed. The resulting seaweed extract concentrate can be used in plant and soil amendments, rooting hormones, other organic plant and soil amendments, organic fertilizers, adjuvants for use with organic pesticides, organic fungicides, in combinations of organic pesticides, with fungicides, and as fertilizers for agricultural, commercial and domestic use. The resulting seaweed extract concentrate can also be used to (Continued)

regulate plant growth, or as a plant nutrient. The method is believed to be able to prepare an extract concentrate from any high protein biomass, including *Sargassum*, water hyacinth or other seaweed.

13 Claims, 4 Drawing Sheets

(51) Int. Cl.
    *C05F 17/40*     (2020.01)
    *C05F 17/10*     (2020.01)
    *C05F 17/20*     (2020.01)
    *A01C 21/00*     (2006.01)
    *A01N 65/00*     (2009.01)
    *A01N 65/03*     (2009.01)
    *A23J 1/00*     (2006.01)
    *A23J 3/20*     (2006.01)
    *A01D 44/00*     (2006.01)

(52) U.S. Cl.
    CPC .............. *A23J 1/009* (2013.01); *A23J 3/20* (2013.01); *C05F 17/10* (2020.01); *C05F 17/20* (2020.01); *C05F 17/40* (2020.01); *C05F 17/60* (2020.01); *A01D 44/00* (2013.01)

(58) Field of Classification Search
    CPC . A23J 3/20; A01N 65/00; A01N 65/03; A01C 21/00; A01D 44/00
    USPC ........... 210/605, 612, 613, 631; 71/9, 10, 23
    See application file for complete search history.

(56) References Cited

OTHER PUBLICATIONS

Khan et al., "Seaweed Extracts as Biostimulants of Plant Growth and Development" Journal of Plant Growth Reul (2009) 28:368-399 Retrieved from the internet Dec. 11, 2019) https://www.researchgate.net/profile/Wajahatullah_Khan/publication/225338767_Seaweed_Extracts_as_Biostimulants_of_Plant_Growth_and_Development/links/0912f50c0ea222a6af000000/ Seaweed-Extracts-as-Biostimulants-of-Plant-Growth-and-Development.pdf.
Int'l Search Report, PCT/US2019/056517, dated Jan. 7, 2020.
Written Opinion, PCT/US2019/056517, dated Jan. 7, 2020.

\* cited by examiner

METHOD OF COMMERCIAL PRODUCTION OF AQUEOUS *SARGASSUM* SEAWEED EXTRACT CONCENTRATE AND BIOSTIMULANT PRODUCTS

FIELD OF THE INVENTION

The invention relates to a system and method for commercial production of aqueous *Sargassum* seaweed extract concentrate having arsenic level of around 1.32-15 mg/l; cadmium level of around 0.005-5 mg/l; lead level of around 0.2-12 mg/l; mercury level of around 0.00002-2 mg/l; and pH of around 7.4-9. The resulting seaweed extract concentrate can be used in plant and soil amendments, rooting hormones, other organic plant and soil amendments, organic fertilizers, adjuvants for use with organic pesticides, organic fungicides, in combinations of organic pesticides, with fungicides, and as fertilizers for agricultural, commercial and domestic use. The resulting seaweed extract concentrate can also be used to regulate plant growth, or as a plant nutrient. The method is believed to be able to prepare an extract concentrate from any high protein biomass, including *Sargassum*, water hyacinth or other seaweed.

BACKGROUND OF THE INVENTION

More than 70% of the world's surface is covered by oceans. Marine organisms offer a rich source of natural products as they are rich reservoirs of structurally diverse bio-functional components. Among marine organisms, marine algae are rich sources of structurally diverse bioactive compounds with various biological activities.

Two major types of algae can be identified: macroalgae that occupy the littoral zone, and microalgae are found in both bentheic and littoral habitats and also throughout the ocean waters as phytoplankton. Marine macroalgae or seaweeds are found in the coastal region between high tide to low tide and in the sub-tidal region up to a depth where 0.01% photosynthetic light is available and can be classified into three classes: Brown algae (Phaeophyta), Green algae (Chlorophyta), and Red algae (Rhodophyta).

Brown seaweeds are predominantly brown due to the presence of the carotenoid fucoxanthin, and the primary polysaccharides present include alginates, laminarins, fucans, and cellulose. Green seaweeds are dominated by chlorophyll a and b, with ulvan being the major polysaccharide component. In Red seaweeds, principal pigments are phycoerythrin and phycocyanin and the primary polysaccharides are agars and carrageenans.

*Sargassum* is a genus of brown (class Phaeophyceae) macroalgae (seaweed) in the order Fucales. Approximately 400 species are distributed throughout the temperate and tropical oceans of the world, where they generally inhabit shallow water and coral reefs, and the genus is widely known for its planktonic (free-floating) species. They are nutritious and a rich source of bioactive compounds such as vitamins and carotenoids. *Sargassum* spp. has the potential to be used as an input for crop production systems where they have been found to improve crop productivity as well as improve resilience and resistance of crops to harsh environmental conditions and pests respectively. Accordingly, *Sargassum* spp. can be used as raw material for liquid fertilizers and fertilizer amendments in crop as well as in the form of compost for boosting crop productivity. Seaweed meal and seaweed extracts are currently the two main forms of seaweed products used globally in the agricultural sector.

Seaweed extracts allow for variations in concentration of the final product. The extracts are easy to dilute and tend to have rapid effects on targeted crop species. In the application of seaweed in the raw or composted form, soil salinity is a major issue.

BRIEF SUMMARY OF THE INVENTION

The invention relates to a system and method for the commercial production of *Sargassum* seaweed concentrate. The *Sargassum* is treated to lower salt content, then it is dried and thereafter added to an aqueous solution of citric acid, sugar cane, alcohol and/or molasses. Yeast is added and anaerobic digestion occurs for about 7-45 days. Thereafter the aqueous solution is pH adjusted then aerated for about 2-8 hours for removal of hydrogen sulfide. The resulting *Sargassum* extract concentrate is low in arsenic, cadmium, lead and mercury.

In one embodiment of the invention, the *Sargassum* seaweed extract concentrate is useful as a component of plant and soil amendments, rooting hormones, other organic plant and soil amendments, organic fertilizers, adjuvants for use with organic pesticides, organic fungicides, in combinations of organic pesticides, with fungicides, and as fertilizers for agricultural, commercial and domestic use. The resulting extract concentrate can also be used to regulate plant growth, or as a plant nutrient.

BRIEF DESCRIPTION OF THE DRAWINGS

The features of the invention will be described in greater detail with reference to the following description, claims, drawings, wherein like designations denote like elements.

DETAILED DESCRIPTION OF THE INVENTION

Figure 1:
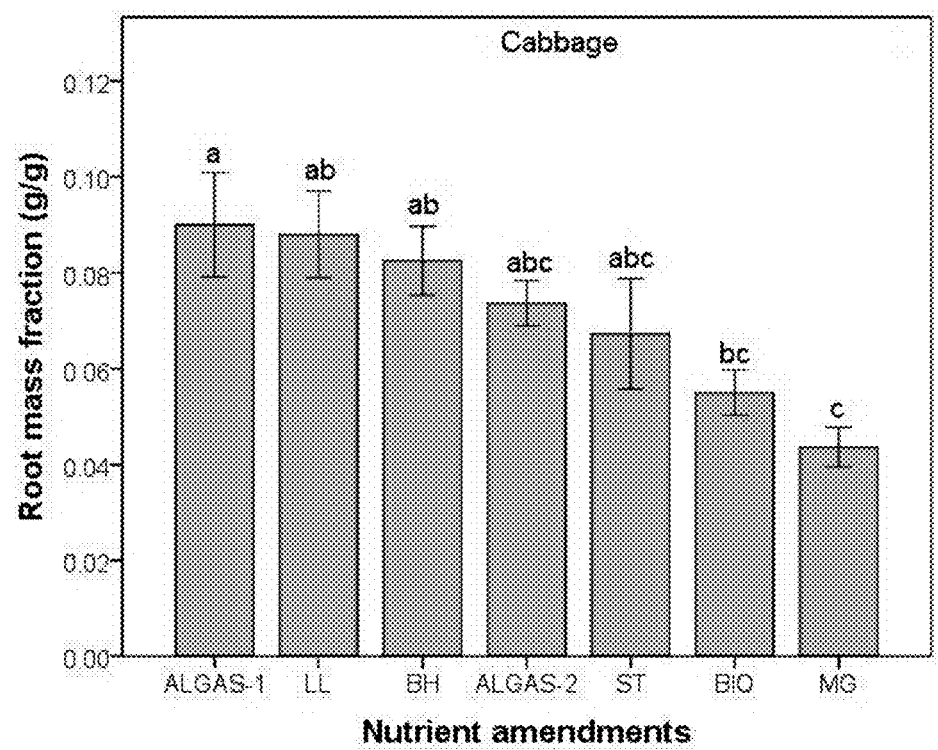
FIG. 1 is a depiction of the effect of various nutrient amendments on the root mass fraction of cabbage and indicating statistical variations between applications of the nutrient amendment.
Figure 2:
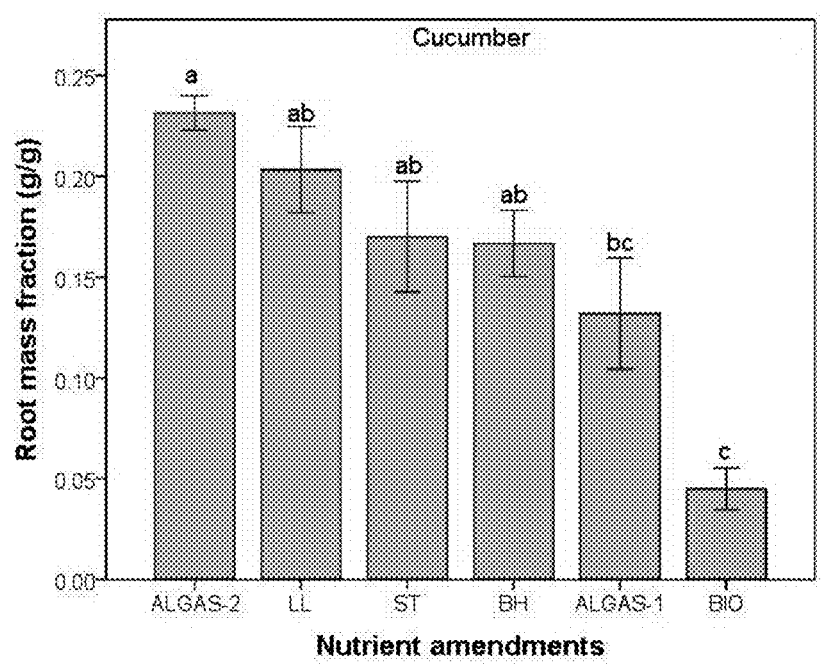
FIG. 2 is a depiction of the effect of various nutrient amendments on the root mass fraction of cucumber and indicating statistical variations between applications of the nutrient amendment.
Figure 3:
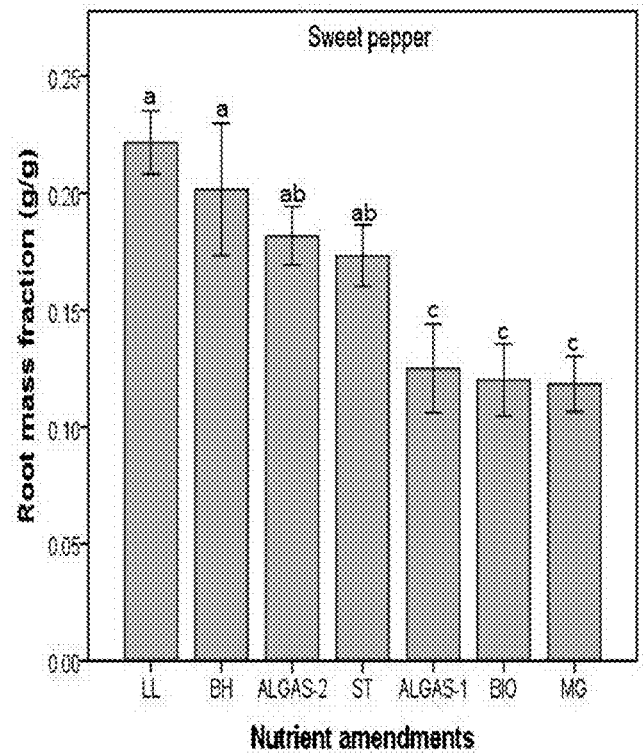
FIG. 3 is a depiction of the effect of various nutrient amendments on the root mass fraction of sweet pepper and indicating statistical variations between applications of the nutrient amendment.
Figure 4:
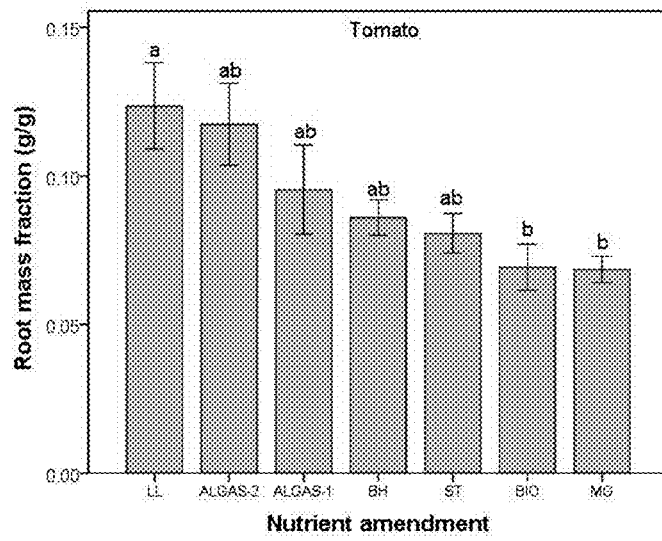
FIG. 4 is a depiction of the effect of various nutrient amendments on the root mass fraction of tomato and indicating statistical variations between applications of the nutrient amendment.

According to the method of the invention, *Sargassum* seaweed or organic matter is first conditioned. Any species of *Sargassum* seaweed can be used. In one embodiment, the species *Sargassum Natans* (Common Gulfweed) is used. In one embodiment, *Sargassum Fluitans* (Broad-toothed Gulfweed) is used. Around 500 ml-3785 ml of a solution consisting of 25% acetic acid in 5 gallons of water is prepared. To this diluted solution, about 30 kg of seaweed mass is added and rinsed for about 15 minutes to remove impurities and to bring the salt content of the *Sargassum* to 4-7.5 parts per trillion and electrical conductivity to 9-12.61 mS/cm. The rinsed *Sargassum* is thereafter conditioned by drying at a temperature of around 80-140 degrees Fahrenheit for about 8-24 hours.

Water is heated at 60-65 degrees Fahrenheit in a plurality of extraction tanks. These tanks are interconnected at the base, by pipes with valves, which allow for control of inflow and outflow. Each tank is placed on top of containment pallets to catch any leakages resulting from pipe failure due to pressure.

The dried *Sargassum* is lowered into an extraction tank, using overhead pulleys, in the ratio of around 1-100 parts seaweed: 20-40 parts of the heated water solution comprising 15% citric acid. A mixture of sugar cane, 80% ethanol and/or molasses, alone or in combination, are added to the mixture at the rate of 1-4 parts total of the component or combination of components per each part of seaweed. Yeast (*Schizosaccharomyces pombe*) is then added at 10 grams per part of seaweed and anaerobic digestion is allowed to take place for 7-45 days at a temperature of about 30 degrees Celsius.

Thereafter, solid waste matter is lifted out of the tanks by overhead pulleys and the remaining aqueous solution is transferred via pump to a further processing tank where it is adjusted to a pH of about 7.5-9. The aqueous solution is next transferred to a storage tank and aerated for a total of 2-8 hours to remove hydrogen sulfide until the aqueous solution is odorless.

The result of the process is an aqueous *Sargassum* seaweed concentrate whereby:
 Arsenic level is 1.32-15 mg/l
 Cadmium level is 0.005-5 mg/l
 Lead level is 0.2-12 mg/l
 Mercury level is 0.00002-2 mg/l
 pH is: 7.4-9

Aqueous *Sargassum* seaweed concentrate made according to the disclosed process has been found to induce vigorous root development and produces root mass fraction on average of 0.18 g/g across a variety of crops including cucumber; cabbage; sweet peppers; and tomatoes.

Example 1

Two species of *Sargassum* seaweed, *Sargassum Natans* and *Fluitan*, were harvested from Dennery, St. Lucia. The harvested *Sargassum* seaweed was conditioned by adding around 30 kg of seaweed to around 600 ml of a solution consisting of 25% acetic acid per 5 gallons of water. The seaweed was rinsed for about 15 minutes to remove impurities and to bring the salt content of the *Sargassum* to 7.5 parts per trillion and electrical conductivity to 12.61 mS/cm. The rinsed *Sargassum* was thereafter conditioned by drying at a temperature of around 86 degrees Fahrenheit for 12 hours.

The dried *Sargassum* was lowered into an extraction tank containing water heated to around 60-65 degrees Fahrenheit, using overhead pulleys, in the ratio of around 10 parts seaweed: 1 parts of the heated water solution comprising 15% citric acid. A mixture of sugar cane, 80% ethanol alcohol and/or molasses are added to the mixture at the rate of 1-4 parts per each part of seaweed Yeast (*Schizosaccharomyces pombe*) was then added at 10 grams per part of seaweed and anaerobic digestion was allowed to take place for 10 days.

Thereafter, solid waste matter was lifted out of the tanks by overhead pulleys and the remaining aqueous solution was transferred via pump to a further processing tank where it was adjusted to a pH of about 7.4. The aqueous solution was next transferred to a storage tank and aerated for a total of 2 hours to remove hydrogen sulfide until the aqueous solution was odorless.

The result of the process was an aqueous *Sargassum* seaweed extract concentrate whereby:
 Arsenic level is 1.32 mg/l
 Cadmium level is 0.002 mg/l
 Lead level is 0.01 mg/l
 Mercury level is 0.000001
 pH is: 7.4

Example 2

Five seeds of each crop species tomato, cucumber, cabbage and sweet pepper were planted in Styrofoam® containers and amendments were applied. Treatments were arranged in a completely randomised design with six replications per treatment. A reference treatment, which consisted of each of the respective crop with no amendments but only the addition of water, was used for observation in each of two trials.

The plant growth substrate used in the experiments was Hecomix Professional Growing Medium® (HEVECO Ltd, Quebec, Canada) (Table 1). The plant growth substrate was thoroughly mixed with shovel and moistened with potable water to near water-holding capacity before being placed in Styrofoam® containers. After placement in the Styrofoam® containers, the plant growth substrate was again moistened with potable water. Initially, five seeds per crop species were sown 1 cm deep in substrates and nine days after sowing (DAS), seedlings were thinned to 1 seedling/container. An experimental unit consisted of a Styrofoam® container (top diameter—12.7 cm, bottom diameter—10.2 cm and height—8.9 cm), with one seedling, which was spaced 20 cm within and between rows on 1.2 m—high plastic-seedling shelving units in a conventional span-roof, naturally ventilated greenhouse (length—3.0 m, width—2.5 m, height—4.0 m), located at Smart-ready Consultancy Ltd, Curepe, Trinidad and Tobago. Greenhouse day and night temperatures averaged 33° C. and 24° C., respectively, with average relative humidity value of 71%. Water was applied to the seedlings with a watering can as per requirements. Amendments were applied to experimental units 21 DAS and every 7 days thereafter, using a watering can and in accordance with application rates recommended in label instructions. At sixty DAS, seedlings were harvested for growth and root trait analysis.

Results are shown in FIGS. 1-4 where LL=liquid litter made from chicken manure; BH=Bountiful Harvest® made from seaweed extract; BIO=Bio20 made from seaweed extract, enriched with NPK; MG=Miracle Gro® conventional fertilizer; Algas-1=biostimulant made from *Sargassum* seaweed extract according to the invention wherein the seaweed extract was placed into a tank that did not contain sugar cane, 80 wt. % ethanol or molasses; Algas-2=biostimulant made from *Sargassum* seaweed extract according to the invention wherein the seaweed extract was placed into a tank containing sugar cane, 80 wt. % ethanol and molasses; and ST=Stimplex®.

Figure 5A:
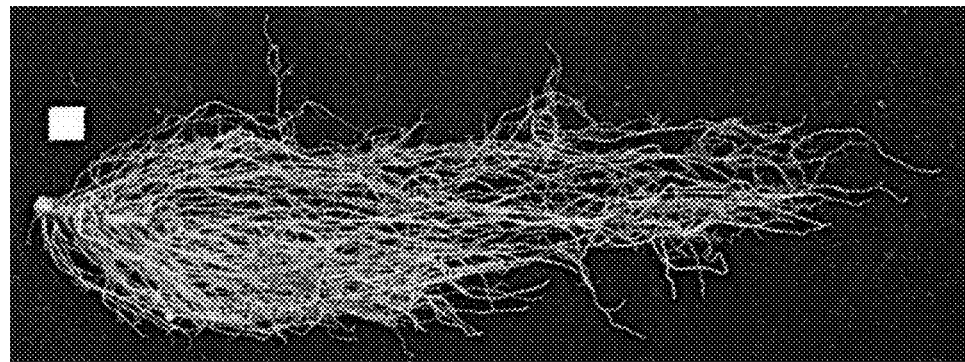
FIGS. 5A and 5B depict root development of crops grown using the *Sargassum* extract concentrate as a component of a biostimulant according to one embodiment of the invention.
Figure 5B:
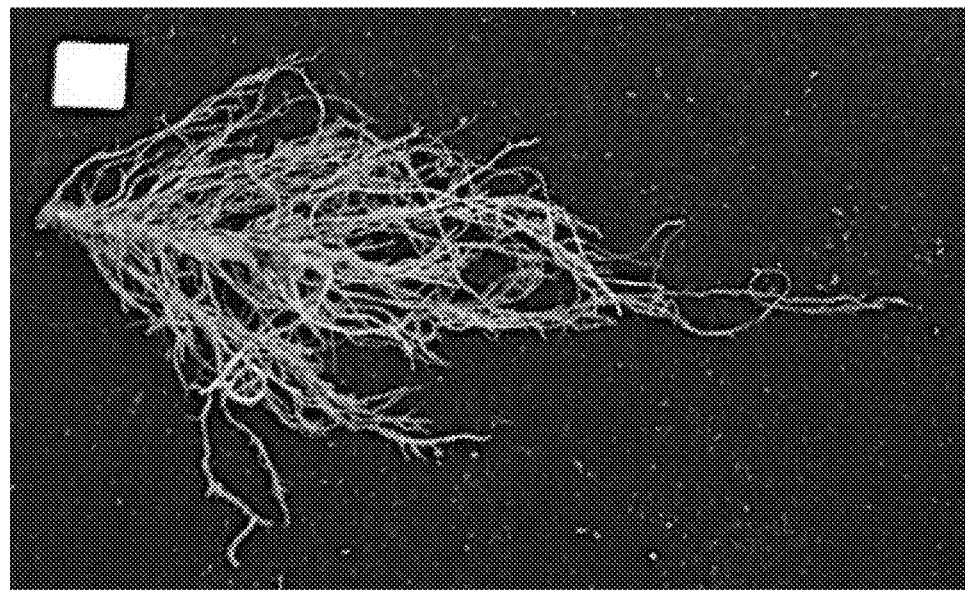

FIGS. 5A and 5B are a comparison of the root masses of tomato plants (*Solanum lycopersicum L.* cv. Dianne) both at 60 days after sowing. The tomato plant root mass in FIG. 5A was treated with *Sargassum* Extract at 60 ml diluted in 1 gallon of water, applied every 7 days for 5 applications. The root fresh weight was 1.8 g. The tomato plant root mass in FIG. 5B was treated with Miracle Gro (Conventional 20-20-

20) Fertilizer diluted 15 ml in 1 gallon of water, applied every 7 days for 5 applications. The root fresh weight was 0.9 grams.

The amount of phosphorous in the solution containing the *Sargassum* extract concentrate contained about 4000 times less phosphorous than the Miracle Gro Fertilizer.

The foregoing embodiments have been presented for the purpose of illustration and description only and are not to be construed as limiting the scope of the invention in any way. While the examples show the method used to prepare biostimulant by preparing extract concentrate from *Sargassum*, the method is believed to be able to prepare an extract concentrate from any high protein biomass, including *Sargassum*, water hyacinth or other seaweed.

What is claimed is:

1. A method of producing an extract from a protein biomass for use as a biostimulant, comprising:
   a. harvesting protein biomass;
   b. adding around 30 kg of the protein biomass to around 500 ml-8785 ml of a solution comprising 25 wt % acetic acid in 5 gallons of water;
   c. rinsing the protein biomass for about 15 minutes to remove impurities until a salt content of the protein biomass is about 4-7.5 parts per trillion and the electrical conductivity is around 9-12.61 mS/cm;
   d. drying the rinsed protein biomass at a temperature of around 80-140 degrees Fahrenheit for 8-24 hours;
   e. placing the dried protein biomass into a tank containing a water solution comprising about 15 wt % citric acid that has been heated to around 60-65 degrees Celsius in a ratio of around 1-100 parts seaweed: 2-40 parts of the heated water solution by weight;
   f. thereafter adding a mixture of one or more of sugar cane extract, 80% ethanol alcohol and molasses to the heated water solution at the rate of 1-4 parts per each part of dried protein biomass by weight;
   g. thereafter adding yeast *Schizosaccharomyces pombe* at 1 grams per part of the dried protein biomass by weight;
   h. thereafter allowing the heated water solution with the high protein biomass to cool to room temperature and stand in a covered container for about 7 to 45 days whereby anaerobic digestion takes place;
   i. thereafter removing the protein biomass from the tank, a protein biomass extract remaining in the tank;
   j. thereafter adjusting the protein biomass extract remaining in the tank to a pH of about 7.4-9; and
   k. thereafter aerating the protein biomass extract for about 2 to 8 hours, wherein an arsenic level in the protein biomass extract is about 1.32-15 mg/l wherein further a cadmium level in the protein biomass extract is about 0.005-5 mg/l, wherein a lead level in the protein biomass extract is about 0.2-12 mg/l, wherein a mercury level in the protein biomass extract is about 0.00002-2 mg/l, and wherein the pH of the protein biomass extract is about pH is: 7.4-9.

2. The method of claim 1, wherein the protein biomass comprises seaweed or water hyacinth.

3. The method of claim 2, wherein the seaweed comprises *Sargassum*.

4. The method of claim 3, wherein the *Sargassum* comprises *Natans* and *Fluitans*.

5. The method of claim 4, wherein the high protein biomass comprises about 30 kg of a combination of *Sargassum Natans* and *Fluitans*, wherein the protein biomass is added to around 600 ml of a solution comprising 25 wt. % acetic acid in 5 gallons of water.

6. The method of claim 1, wherein the salt content of the protein biomass after rinsing for about 15 minutes to remove impurities is about 7.5 parts per trillion and electrical conductivity is around 12.61 mS/cm.

7. The method of claim 1, wherein the rinsed protein biomass is dried following rinsing at a temperature of around 86 degrees Fahrenheit for about 12 hours.

8. The protein biomass extract of claim 7, comprising 1.32 mg/l arsenic; 0.002 mg/l cadmium; 0.01 mg/l lead; 0.000001 mg/l mercury; and pH 7.4.

9. The method of claim 1, wherein the dried protein biomass is placed into a tank containing water heated to around 60-65 degrees Fahrenheit in the amount of about 10 parts protein biomass: 1 parts of the heated water solution comprising 15% citric acid by weight.

10. A protein biomass extract concentrate made according to the method of claim 1 comprising about 1.32-15 mg/l arsenic, 0.005-5 mg/l cadmium, about 0.2-12 mg/l mg/l lead, about 0.00002-2 mg/l mg/l mercury, and pH 7.4-9.

11. A method of fertilizing a plant comprising applying the biostimulant of claim 1 to a plant.

12. The method of claim 11, wherein the plant comprises vegetables, roots, tubers, flowers, ornamental plants, or grass.

13. The method of claim 12, wherein the plant comprises tomato, green pepper, cucumber or cabbage.

* * * * *